US010267656B2

United States Patent
Tang-Kong

(10) Patent No.: US 10,267,656 B2
(45) Date of Patent: Apr. 23, 2019

(54) CAPACITIVE ENCODER

(71) Applicant: Panasonic Automotive Systems Company of America, Division of Panasonic Corporation of North America, Peachtree City, GA (US)

(72) Inventor: Gerald A. Tang-Kong, Newnan, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 213 days.

(21) Appl. No.: 15/358,997

(22) Filed: Nov. 22, 2016

(65) Prior Publication Data

US 2017/0074685 A1 Mar. 16, 2017

Related U.S. Application Data

(63) Continuation of application No. 14/155,030, filed on Jan. 14, 2014, now Pat. No. 9,534,933.

(51) Int. Cl.
*G01D 5/241* (2006.01)
*G05B 19/409* (2006.01)

(52) U.S. Cl.
CPC ......... *G01D 5/2415* (2013.01); *G05B 19/409* (2013.01); *G05B 2219/2642* (2013.01)

(58) Field of Classification Search
CPC ............... G01D 5/2415; G05B 19/409; G05B 2219/2642
USPC .................................................. 324/658–690
See application file for complete search history.

(56) References Cited

U.S. PATENT DOCUMENTS

2007/0181410 A1* 8/2007 Baier .................... F24C 7/082
200/17 R

* cited by examiner

*Primary Examiner* — Farhana A Hoque
(74) *Attorney, Agent, or Firm* — Laurence S. Roach, Esq.

(57) ABSTRACT

A human machine interface includes a capacitive sensor disposed on an interior side of a face plate. A control device is rotatably coupled to the face plate and is disposed on an exterior side of the face plate. The control device includes at least one electrically conductive element. The control device rotates about an axis substantially perpendicular to the face plate such that the at least one electrically conductive element follows the rotation of the control device. The capacitive sensor senses a rotational position of the at least one electrically conductive element.

19 Claims, 6 Drawing Sheets

CAPACITIVE ENCODER

CROSS-REFERENCE TO RELATED APPLICATION

This application is a continuation of U.S. patent application Ser. No. 14/155,030 filed on Jan. 14, 2014, which is currently under allowance, the disclosure of which are hereby incorporated by reference in their entirety for all purposes.

BACKGROUND OF THE INVENTION

1. Field of the Invention

The present invention relates to capacitive controls, and, more particularly, to capacitive encoders.

2. Description of the Related Art

Current control knobs, such as included in an automotive radio, have a mechanical encoder. A mechanical encoder requires a separate control circuit as well as a hole in the bezel/faceplate for the encoder. Current capacitive designs include a linear slider for volume control or a circular control requiring contact by a finger on the circular face of the control in order to actuate the control.

SUMMARY OF THE INVENTION

The invention may include a capacitive encoder which utilizes the same controller and patterns as capacitive touch buttons in a bezel or faceplate. This enables a rotating knob control of functions such as volume or tuning in a radio. A mechanical detent may engage the control ring structure in order to provide tactile feedback regarding how far the control ring has been rotated (i.e., in angular degrees) by the user.

The invention comprises, in one form thereof, a human machine interface including a capacitive sensor disposed on an interior side of a face plate. A control device is rotatably coupled to the face plate and is disposed on an exterior side of the face plate. The control device includes at least one electrically conductive element. The control device rotates about an axis substantially perpendicular to the face plate such that the at least one electrically conductive element follows the rotation of the control device. The capacitive sensor senses a rotational position of the at least one electrically conductive element.

The invention comprises, in another form thereof, a method of operating a human machine interface, including providing a face plate having an exposed exterior side and an unexposed interior side. A capacitive sensor is provided on the interior side of the face plate. A fixed knob housing is attached to the exterior side of the face plate. A control device is rotatably coupled to the knob housing. The control device includes at least one electrically conductive element. The control device is rotatable about an axis substantially perpendicular to the face plate such that the at least one electrically conductive element follows the rotation of the control device. The capacitive sensor is used to sense a rotational position of the at least one electrically conductive element.

The invention comprises, in yet another form thereof, a human machine interface including a first capacitive sensor disposed on an interior side of a face plate and having a substantially annular shape defining a central opening. A second capacitive sensor is disposed on the interior side of the face plate within the central opening of the first capacitive sensor. A knob is disposed on the exterior side of the face plate. The knob includes a housing fixedly attached to the exterior side of the face plate and including a central throughhole. A control device is rotatably coupled to the housing and includes at least one first electrically conductive element. The control device rotates about an axis substantially perpendicular to the face plate such that the at least one first electrically conductive element follows the rotation of the control device. A pushbutton is disposed in the central throughhole of the housing and is movable in a first axial direction toward the face plate and a second axial direction away from the face plate. A second electrically conductive element is disposed within the central throughhole of the housing and follows the movement of the pushbutton. A spring is disposed between the face plate and the pushbutton and biases the pushbutton in the second axial direction. The first capacitive sensor senses a rotational position of the at least one first electrically conductive element. The second capacitive sensor senses an axial position of the second electrically conductive element.

An advantage of the present invention is that the rotary knob enables the user to have a tactile feel and easily discern how far the knob has been rotated.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
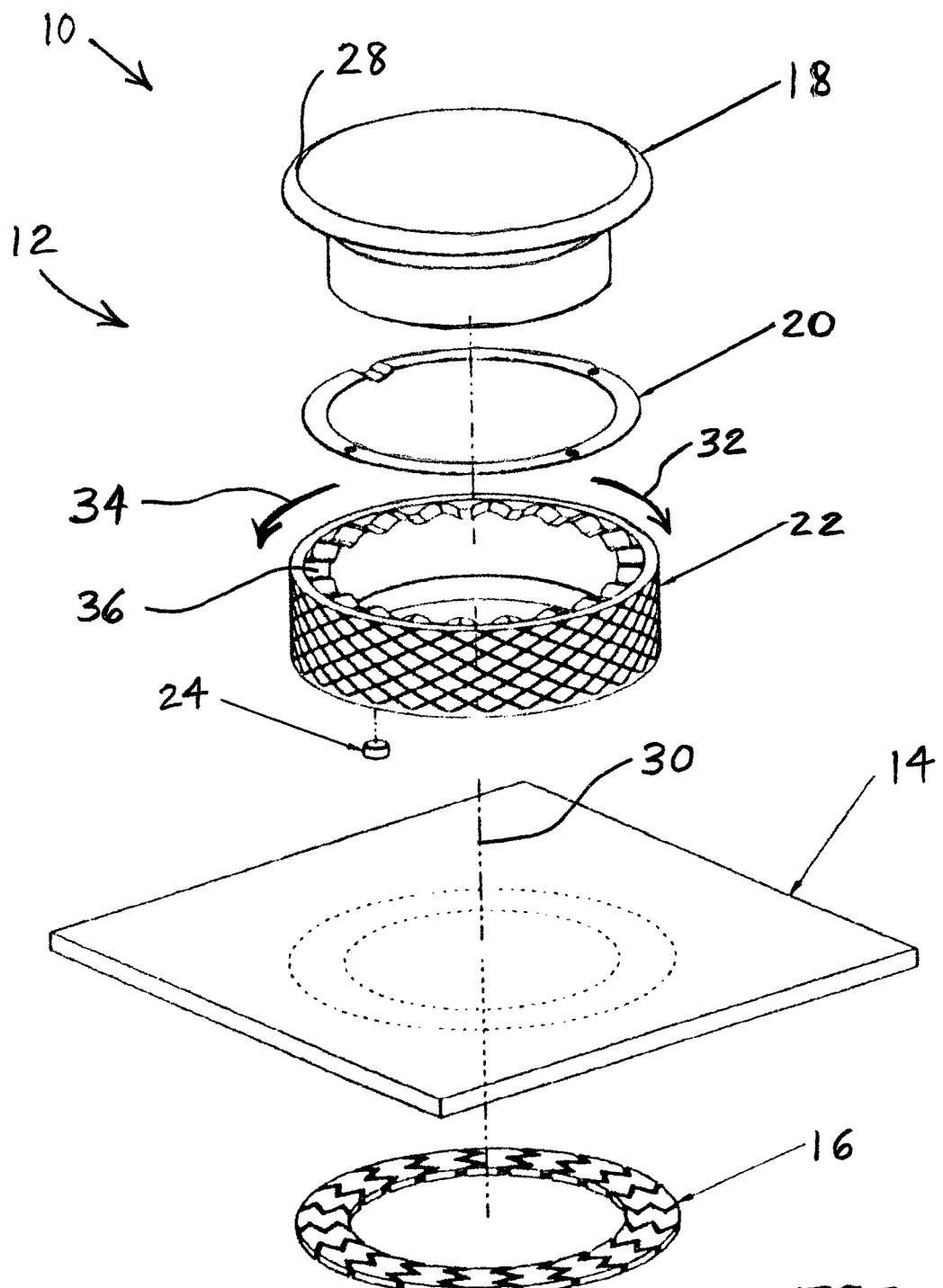
FIG. 1 is an exploded view of one embodiment of a capacitive encoder of the present invention.

FIG. 1 is an exploded view illustrating one embodiment of a human machine interface in the form of a capacitive encoder arrangement 10 of the present invention. Arrangement 10 may be included in a motor vehicle, and particularly in an audio system of a motor vehicle, for example. Arrangement 10 includes a dial or knob 12, a face plate 14, which may be made out of plastic, and a capacitive circular switch pattern 16, which may be fixedly attached to face plate 14. Knob 12 includes a housing 18, a spring detent 20, an outer ring bearing 22, and a conductive element 24 in the form of a disc or other configuration.

Housing 18 may be attached to face plate 14, such as by adhesive 25 (FIG. 3) or a mechanical joint. Spring detent 20 may be attached to an underside 26 of an annular lip 28 of housing 18.

Figure 2:
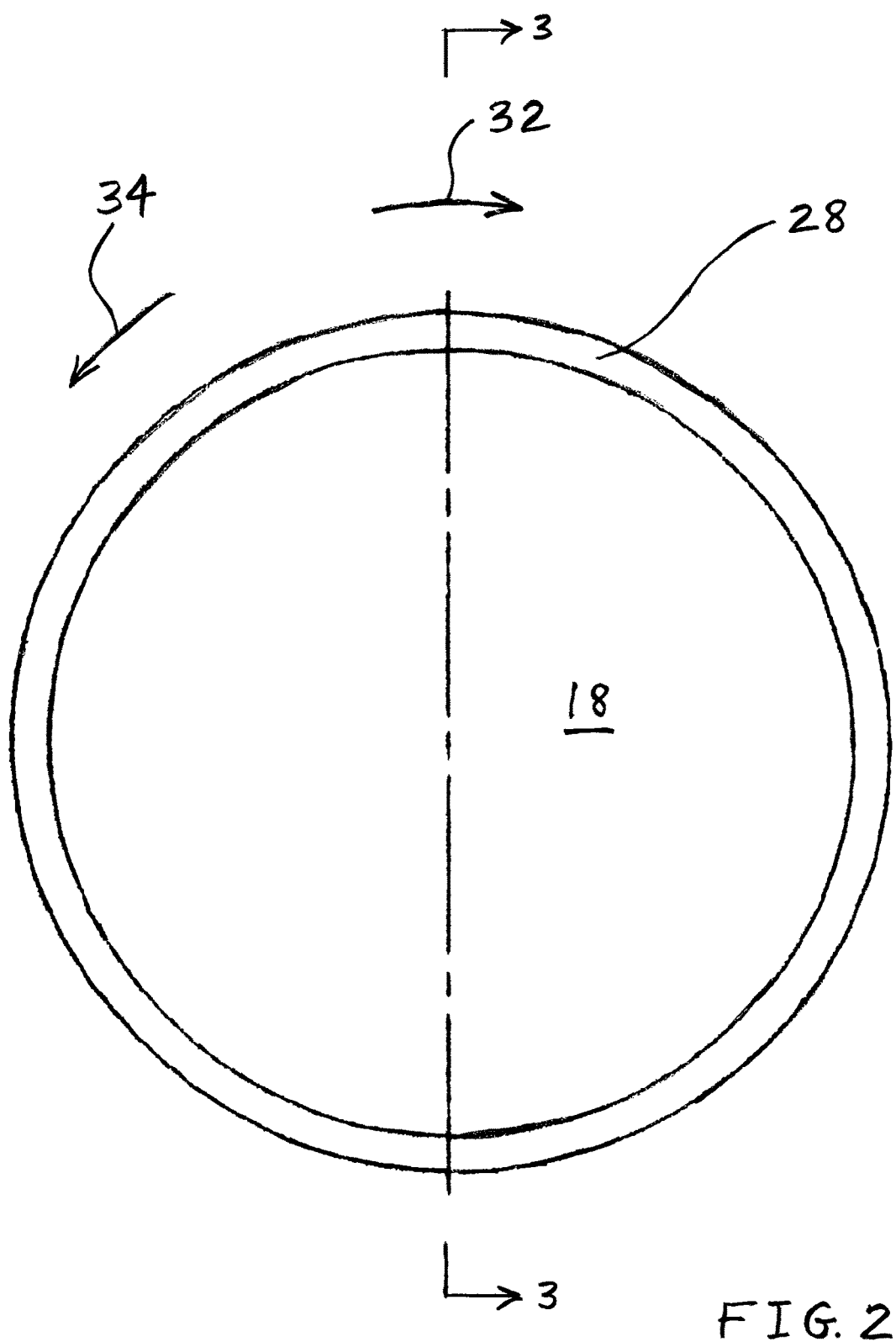
FIG. 2 is a top view of the capacitive encoder of FIG. 1.

Bearing 22 is rotatable in the plane of the page of FIG. 2, i.e., about its longitudinal axis 30, which is substantially perpendicular to face plate 14, in both a clockwise direction 32 and a counterclockwise direction 34. Bearing 22 includes an annular detent 36 that engages with detent 20 as a user manually rotates bearing 22. Thus, detents 20, 36 conjointly operate to provide the user with tactile feedback as he rotates bearing 22.

Figure 3:
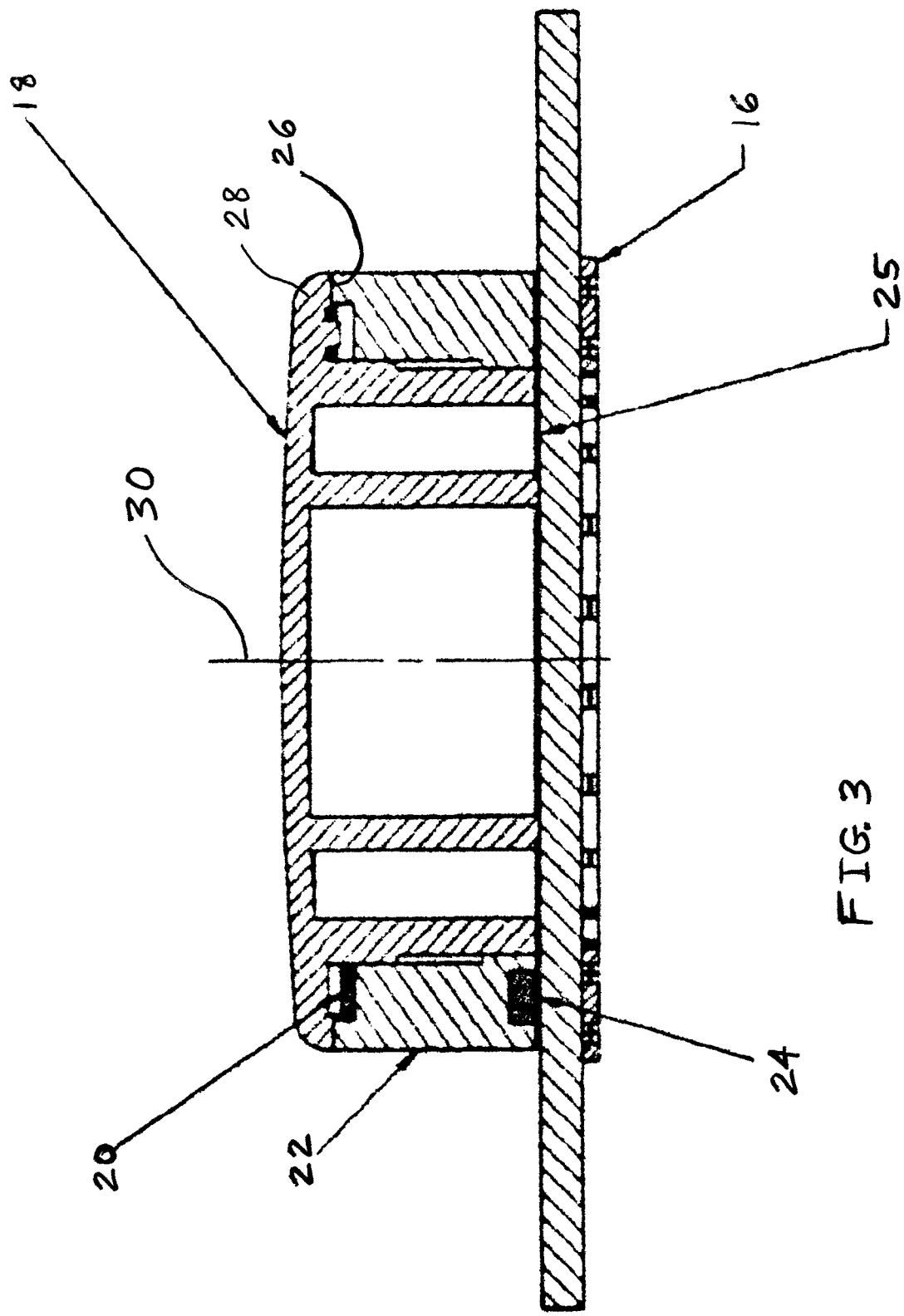
FIG. 3 is a cross sectional view of the capacitive encoder along line 3-3 of FIG. 2.

Knob 12 does not include any wiring or electronics, but bearing 22 does include one or more capacitive elements such as conductive disc 24, which may be made of any electrically conductive material, such as metal or carbon fiber. In the specific embodiment shown in the drawings, there is only one conductive disc 24 which, as shown in FIG. 3, is positioned opposite from capacitive circular switch pattern 16 relative to face plate 14.

In operation, the user may manually rotate bearing 22, detent 36 and conductive disc 24 relative to housing 18, detent 20, face plate 14 and capacitive circular switch pattern 16. Capacitive circular switch pattern 16 may operate as a sensor to determine the position of conductive disc 24 along the rotational path of conductive disc 24, as may be easily understood by those of skill in the art. Disc 24 may be disposed on the longitudinal end of bearing 22 that is adjacent to face plate 14 so as to be close to capacitive circular switch pattern 16 and thus be more easily capacitively sensed thereby. Capacitive circular switch pattern 16 may transmit a corresponding capacitance signal to a processor (not shown) which uses the capacitance signals to determine the rotational locations of conductive disc 24.

Figure 4:
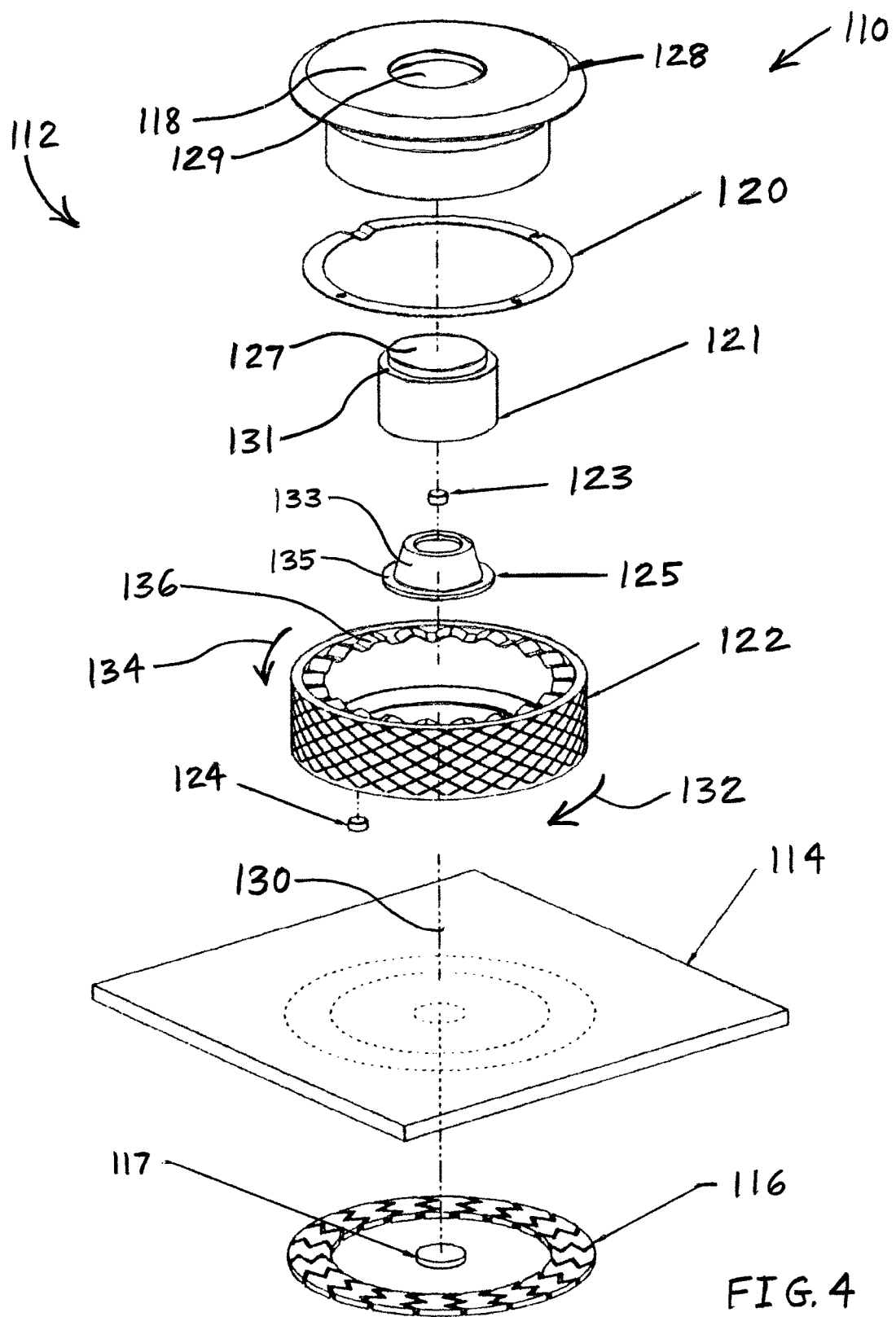
FIG. 4 is an exploded view of another embodiment of a capacitive encoder of the present invention.

Illustrated in FIG. 4 is an exploded view of another embodiment of a human machine interface in the form of a capacitive encoder arrangement 110 of the present invention. Arrangement 110 may be included in a motor vehicle, and particularly in an audio system of a motor vehicle, for example. As in the embodiment of FIGS. 1-3, capacitive encoder 110 includes a knob, specifically knob 112. Arrangement 110 also includes a face plate 114, which may be made out of plastic, a capacitive circular switch pattern 116, which may be fixedly attached to face plate 114, and a capacitive button switch pattern 117, which also may be fixedly attached to face plate 114. Knob 112 includes a housing 118, a spring detent 120, a center push knob 121, a first conductive element 123 in the form of a disc, a spring 125, an outer ring bearing 122, and a second conductive element 124 in the form of a disc.

Housing 118 may be attached to face plate 114, such as by adhesive 119 (FIG. 6) or a mechanical joint. Spring detent 120 may be attached to an underside 126 of an annular lip 128 of housing 118. A head 127 of center pushbutton 121 is received in a central throughhole 129 of housing 128. An annular shoulder 131 of center pushbutton 121 is too large to fit through throughhole 129.

Figure 6:
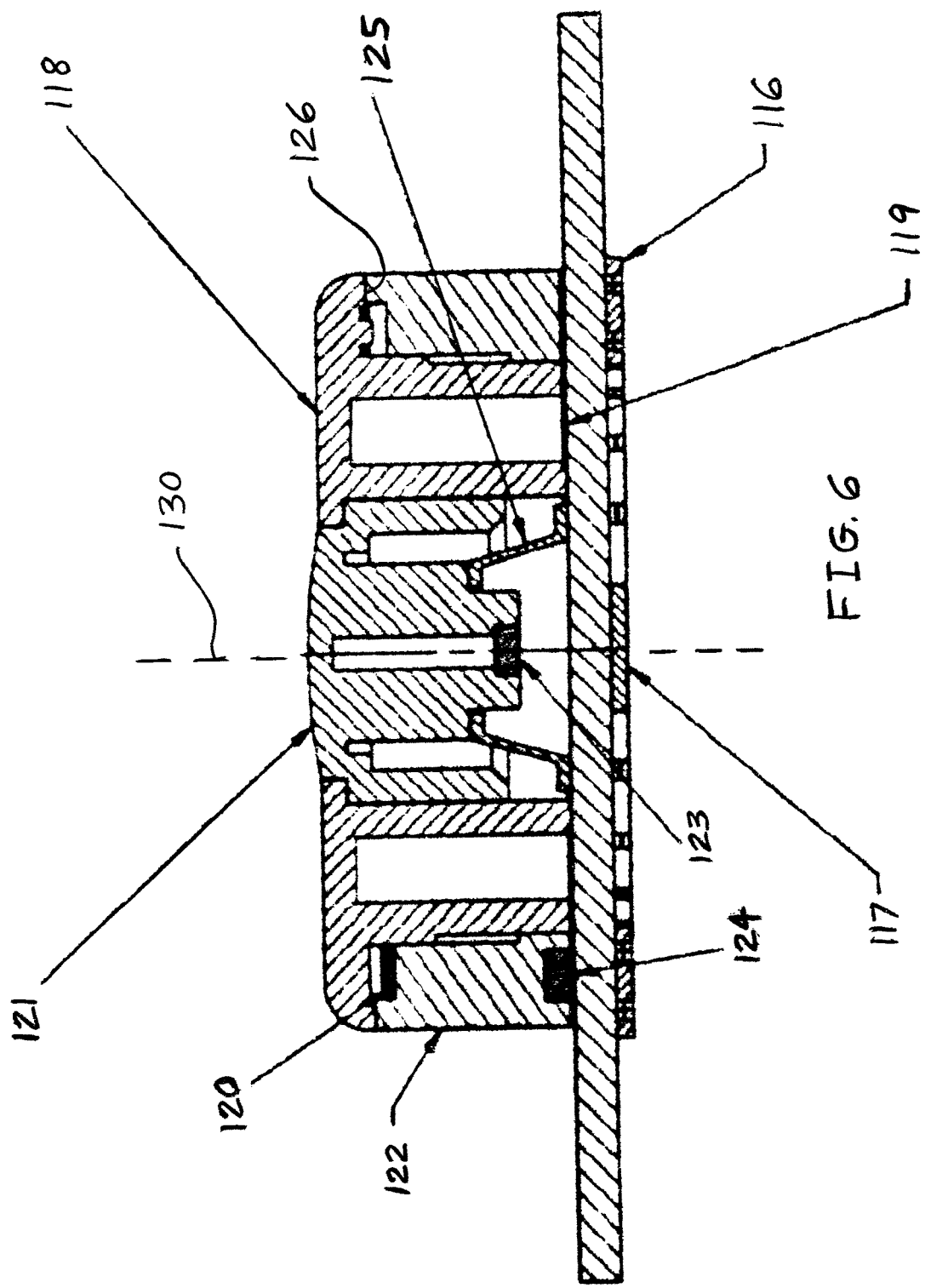
FIG. 6 is a cross sectional view of the capacitive encoder along line 6-6 of FIG. 5.

Spring 125 may be biased against face plate 114 by center pushbutton 121, as best shown in FIG. 6. Spring 125 includes a central recess in which conductive disk 123 is received. Spring 125 includes a frusto-conically shaped body 133 and an annular base 135 extending radially outwardly from an interior end of body 133. Conductive disk 123 is sandwiched between center pushbutton 121 and spring 125. Spring may be of other configuration such as a wave form spring as an example.

Figure 5:
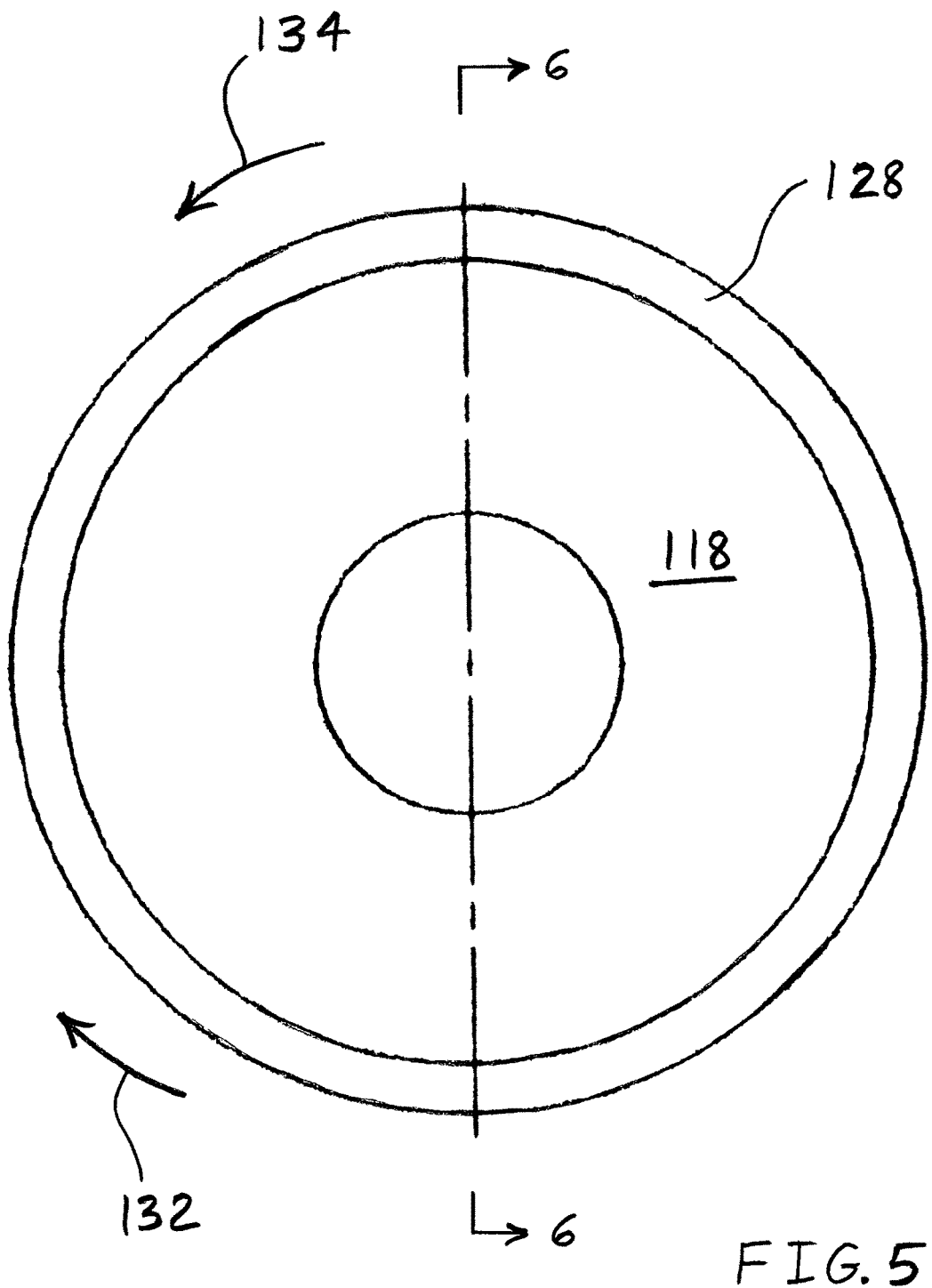
FIG. 5 is a top view of the capacitive encoder of FIG. 4.

Bearing 122 is rotatable in the plane of the page of FIG. 5, i.e., about its longitudinal axis 130, which is substantially perpendicular to face plate 114, in both a clockwise direction 132 and a counterclockwise direction 134. Bearing 122 includes an annular detent 136 that engages with detent 120 as a user manually rotates bearing 122. Thus, detents 120, 136 conjointly operate to provide the user with tactile feedback as he rotates bearing 122.

Knob 112 does not include any wiring or electronics, but bearing 122 does include one or more capacitive elements such as conductive disc 124, which may be made of any electrically conductive material, such as metal or carbon fiber. In the specific embodiment shown in the drawings, there is only one conductive disc 124 which, as shown in FIG. 6, is positioned opposite from capacitive circular switch pattern 116 relative to face plate 114. Similarly, conductive disc 123 is positioned opposite from capacitive button switch pattern 117 relative to face plate 114.

In operation, the user may manually rotate bearing 122, detent 136 and conductive disc 124 relative to housing 118, detent 120, center pushbutton 121, conductive disc 123, spring 125, face plate 114, capacitive circular switch pattern 116, and capacitive button switch pattern 117. Capacitive circular switch pattern 116 may operate as a sensor to determine the position of conductive disc 124 along the rotational path of conductive disc 124, as may be easily understood by those of skill in the art. Disc 124 may be disposed on the longitudinal end of bearing 122 that is adjacent to face plate 114 so as to be close to capacitive circular switch pattern 116 and thus be more easily capacitively sensed thereby. Capacitive circular switch pattern 116 may transmit a corresponding capacitance signal to a processor (not shown) which uses the capacitance signals to determine the rotational locations of conductive disc 124 in terms of rotational positions.

Similarly, capacitive button switch pattern 117 may operate as a sensor to determine the position of conductive disc 123 along longitudinal axis 130, as may be easily understood by those of skill in the art. Capacitive button switch pattern 117 may transmit a corresponding capacitance signal to a processor (not shown) which uses the capacitance signals to determine the locations of conductive disc 123 along longitudinal axis 130. That is, head 127 of center pushbutton 121 may be pushed by the user from the unbiased position in FIG. 6 to a position in which conductive disc 123 is closer to face plate 114. Conductive disc 123 may be received in a recess of spring 125, as shown in FIG. 6. Conductive disc 123 may be biased by spring 125 back into the position of FIG. 6 after the user takes his finger off of head 127 and stops pushing head 127 toward face plate 114.

In the embodiments disclosed above, the rotational position of the bearing may be sensed. If the present invention is applied to an automotive application, then an operating parameter of an audio system, an HVAC system, or a navigation system, for example, of a motor vehicle may be adjusted dependent upon the sensed rotational position.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A human machine interface comprising:
   a face plate;
   a capacitive sensor disposed on an interior side of the face plate;
   a control device rotatably coupled to the face plate and disposed on an exterior side of the face plate, the control device including at least one electrically conductive element, the control device being configured to rotate about an axis substantially perpendicular to the face plate such that the at least one electrically conductive element follows the rotation of the control device, wherein the capacitive sensor is configured to sense a rotational position of the at least one electrically conductive element;
a housing fixedly attached to the exterior side of the face plate, the housing including an annular lip, the control device being rotatably coupled to the housing; and
an annular detent sandwiched between the housing and the control device, the annular detent being attached to an interior side of the annular lip of the housing.

2. The interface of claim 1 wherein the control device comprises an annular bearing.

3. The interface of claim 1 wherein the annular detent comprises a first annular detent, the control device including a second annular detent engaging the first annular detent.

4. The interface of claim 1 wherein the at least one electrically conductive element comprises a disc.

5. The interface of claim 1 wherein the at least one electrically conductive element is disposed on an interior end of the control device.

6. The interface of claim 1 wherein the capacitive sensor has an annular shape.

7. The interface of claim 1 wherein the capacitive sensor comprises a capacitive circular switch pattern.

8. A method of operating a human machine interface, comprising the steps of:
providing a face plate including an exposed exterior side and an unexposed interior side;
providing a first capacitive sensor on the interior side of the face plate;
rotatably coupling a control device to the face plate, the control device including a first electrically conductive element, the control device being rotatable about an axis substantially perpendicular to the face plate such that the first electrically conductive element follows the rotation of the control device;
using the first capacitive sensor to sense rotational movement of the first electrically conductive element;
providing a second capacitive sensor on the interior side of the face plate;
slidably coupling a pushbutton to the control device, the pushbutton including a second electrically conductive element, the pushbutton being slidable along the axis substantially perpendicular to the face plate such that the second electrically conductive element follows the sliding of the pushbutton; and
using the second capacitive sensor to sense actuation of the pushbutton in axial directions toward and away from the face plate such that the second electrically conductive element follows the movement toward and away from the face plate, the second capacitive sensor sensing movement of the second electrically conductive element in the directions toward and away from the face plate.

9. The method of claim 8 comprising the further step of adjusting an operating parameter of an audio system, an HVAC system, or a navigation system of a motor vehicle, the adjusting being dependent upon a sensed rotational position of the control device.

10. The method of claim 8 wherein the at least one electrically conductive element is disposed on an interior end of the control device.

11. The method of claim 8 wherein the control device comprises an annular bearing.

12. The method of claim 8 wherein the capacitive sensor has an annular shape.

13. The method of claim 8 comprising the further steps of:
providing the control device with a detent; and
using the detent to provide a user with tactile feedback in response to the user rotating the control device about the axis.

14. A human machine interface comprising:
a face plate;
a first capacitive sensor disposed on an interior side of the face plate and having a substantially annular shape defining a central opening;
a second capacitive sensor disposed on the interior side of the face plate within the central opening of the first capacitive sensor;
a knob disposed on the exterior side of the face plate, the knob including:
a housing fixedly attached to the exterior side of the face plate;
a control device rotatably coupled to the housing and including at least one first electrically conductive element; the control device being configured to rotate about an axis substantially perpendicular to the face plate such that the at least one first electrically conductive element follows the rotation of the control device; and
a pushbutton disposed in the housing and movable in a first axial direction toward the face plate and a second axial direction away from the face plate;
a second electrically conductive element disposed within the housing and configured to follow the movement of the pushbutton; and
a spring disposed between the face plate and the pushbutton and configured to bias the pushbutton hi the second axial direction;
wherein the first capacitive sensor is configured to sense a rotational position of the at least one first electrically conductive element, and the second capacitive sensor is configured to sense an axial position of the second electrically conductive element.

15. The interface of claim 14 wherein the second electrically conductive element is disposed in a recess of the spring.

16. The interface of claim 14 wherein the second capacitive sensor is disposed in the central opening of the first capacitive sensor.

17. The interface of claim 14 wherein the second electrically conductive element is disposed at an interior end of the pushbutton.

18. The interface of claim 14 wherein the spring includes a frusto-conically shaped body and an annular base extending radially outwardly from an interior end of the body.

19. The interface of claim 14 further comprising:
a first detent on the knob housing; and
a second detent on an exterior end of the control device configured to engage the first detent and thereby provide a user with tactile feedback in response to the user rotating the control device.

\* \* \* \* \*